(12) United States Patent
Chen et al.

(10) Patent No.: US 8,606,836 B2
(45) Date of Patent: Dec. 10, 2013

(54) APPARATUS AND METHOD FOR FREQUENCY DIVISION AND FILTERING

(75) Inventors: Ting-Hsuan Chen, Yangmei Township, Taoyuan County (TW); Gaung-Hui Gu, Checheng Township, Pingtung County (TW); Ying-Chiang Hu, Bade (TW); Tsung-Min Hsieh, Tainan (TW); Jun-Chao Zhao, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 703 days.

(21) Appl. No.: 12/868,200

(22) Filed: Aug. 25, 2010

(65) Prior Publication Data

US 2011/0158259 A1  Jun. 30, 2011

(30) Foreign Application Priority Data

Dec. 31, 2009 (TW) ............................... 98146264 A (51) Int. Cl.
*G06F 17/10* (2006.01)
(52) U.S. Cl.
USPC ........................................................ 708/300
(58) Field of Classification Search
None
See application file for complete search history.

(56) References Cited

U.S. PATENT DOCUMENTS

| | | | |
|---|---|---|---|
| 5,983,162 A | 11/1999 | Huang | |
| 6,311,130 B1 | 10/2001 | Huang | |
| 6,947,495 B2 * | 9/2005 | Ezquerra-Moreu et al. | .. 375/319 |
| 2003/0058964 A1 * | 3/2003 | Ezquerra-Moreu et al. | .. 375/319 |
| 2010/0158259 A1 * | 6/2010 | Hanna et al. | ..................... 381/28 |
| 2012/0245713 A1 * | 9/2012 | Chen et al. | ...................... 700/83 |

FOREIGN PATENT DOCUMENTS

| | | |
|---|---|---|
| TW | I307227 | 3/2009 |
| TW | I309520 | 5/2009 |

OTHER PUBLICATIONS

English language translation of abstract of TW I307227 (published Mar. 1, 2009).
English language translation of abstract of TW I309520 (published May 1, 2009).

\* cited by examiner

*Primary Examiner* — David H Malzahn
(74) *Attorney, Agent, or Firm* — McClure, Qualey & Rodack, LLP (57) ABSTRACT

An apparatus and method for frequency division and filtering are provided. The apparatus includes a memory unit, an extrema calculation unit, and an envelope calculation unit. The memory unit is for storing sample data. The extrema calculation unit is for outputting and storing a number of maximum values and a number of minimum values to the memory unit according to the sample data. The envelope calculation unit is for calculating a mean envelope according to the maximum values and the minimum values, wherein within a duration when the envelope calculation unit respectively calculates an upper envelope and a lower envelope according to the maximum values and the minimum values, the envelope calculation unit outputs a value of the mean envelope to the memory unit according to a value of the upper envelope and a value of the lower envelope with respect to a corresponding identical address.

23 Claims, 8 Drawing Sheets

APPARATUS AND METHOD FOR FREQUENCY DIVISION AND FILTERING

This application claims the benefit of Taiwan application Serial No. 98146264, filed Dec. 31, 2009, the subject matter of which is incorporated herein by reference.

BACKGROUND

1. Technical Field

The disclosure relates in general to an apparatus for signal analysis, and more particularly to an apparatus for frequency division and filtering.

2. Description of the Related Art

In the field of signal processing, wavelet transform is widely applied in processing and filtering of signal noise. However, the wavelet transform is applicable to linear and stable signals based on Fourier transform theory. In terms of non-linear and unstable signals, the Fourier transform can only obtain an average distribution of signal energy, but not the information varying with time.

The empirical mode decomposition of Hilbert-Huang transform (HHT) can analyze the tendency of an unstable and non-linear signal varying with time and concretely decompose it into a number of intrinsic mode functions within different frequency ranges. The empirical mode decomposition can also be used to perform filtering processing. For example, electrocardiogram is easily interfered by a lot of noise in the measuring process to influence its judgment, which leads to difficulty of characteristic extraction. Through HHT, noise of the electrocardiogram can be filtered according to different intrinsic mode functions. Besides, the empirical mode decomposition can also be used to analyze unstable and non-linear signals in different fields.

The present HTT or empirical mode decomposition mainly executes relevant algorithm programs by software in a general computer system to verify the input signals after signal processing. However, the conventional software operation is limited in performance and calculation time. Therefore, the technique of HTT or empirical mode decomposition still needs to be improved to increase performance and reduce calculation time so as to meet the requirement of timely processing.

SUMMARY

The disclosure is directed to a signal filtering apparatus, which provides a circuit structure for signal filtering processing to determine signals indicating the signal tendency. Different embodiments of the signal filtering apparatus effectively calculate a mean envelope by hardware resource to save time and improve performance. The embodiments of the signal filtering apparatus can be used to perform the empirical mode decomposition or related application, such as signal filtering.

According to a first aspect of the present disclosure, an apparatus for frequency division and filtering is provided. The apparatus includes: a memory unit, an extrema calculation unit, and an envelope calculation unit. The memory unit is for storing sample data. The extrema calculation unit is for outputting and storing a number of maximum values and a number of minimum values to the memory unit according to the sample data. The envelope calculation unit is for calculating a mean envelope according to the maximum values and the minimum values, wherein within a duration when the envelope calculation unit respectively calculates an upper envelope and a lower envelope according to the maximum values and the minimum values, the envelope calculation unit outputs a value of the mean envelope to the memory unit according to a value of the upper envelope and a value of the lower envelope with respect to a corresponding identical address.

According to a second aspect of the present disclosure, a method for frequency division and filtering is provided. The method includes the following steps. Based on sample data, outputting and storing a number of maximum values and a number of minimum values of the sample data are outputted and stored into a memory unit. A mean envelope is calculated according to the maximum values and the minimum values by using an envelope calculation unit, wherein within a duration when an upper envelope and lower envelope are calculated according to the maximum values and the minimum values, a value of the mean envelope is outputted to the memory unit, according to a value of the upper envelope and a value of the lower envelope with respect to a corresponding identical address.

According to other aspects of the disclosure, the above apparatus or method for frequency division and filtering can be further used for empirical mode decomposition or signal filtering as needed.

The above and other aspects of the disclosure will become better understood with regard to the following detailed description of the preferred but non-limiting embodiment(s). The following description is made with reference to the accompanying drawings.

DETAILED DESCRIPTION

In the embodiments of the disclosure, a signal filtering apparatus is disclosed, which provides a circuit structure for signal filtering processing to determine signals indicating the signal tendency. In one embodiment, an envelope calculation unit substantially calculates an upper envelope, a lower envelope and a mean envelope of a signal at the same time, thereby utilizing various hardware resource effectively. In another embodiment, the part of calculation circuit which is idle in envelope calculation can be used to improve the efficiency of envelope calculation by envelope period stealing. In a further embodiment, an exception checking mechanism is performed according to a repeating behavior of the circuit in envelope calculation to further save time for envelope calculation.

Embodiment One

Figure 1:
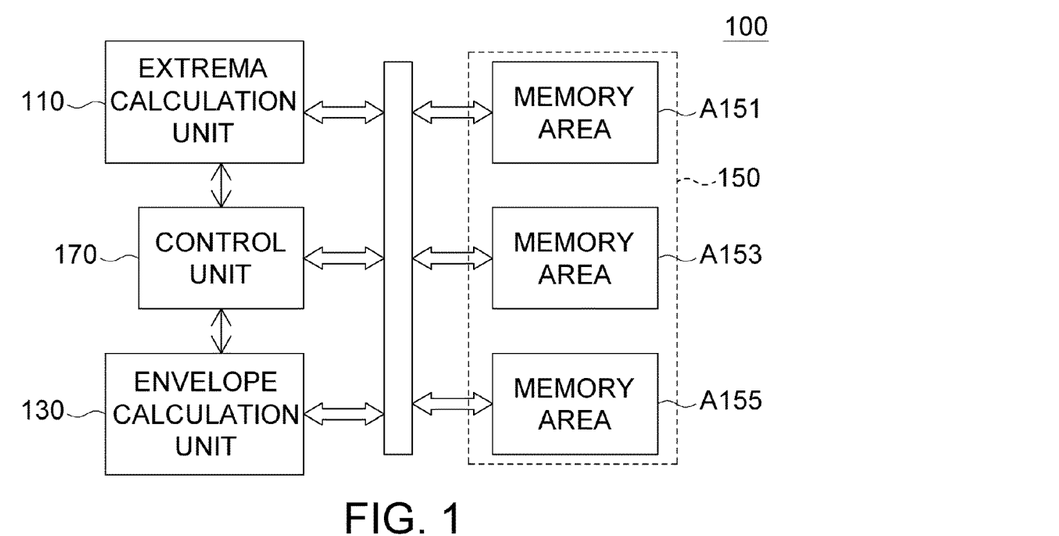
FIG. 1 is a block diagram of a signal filtering apparatus according to a first embodiment of the disclosure.

Referring to FIG. 1, a block diagram of a signal filtering apparatus according to the first embodiment of the disclosure is shown. As shown in FIG. 1, the signal filtering apparatus 100 includes an extrema calculation unit 110, an envelope calculation unit 130, and a memory unit 150. In the first embodiment, the envelope calculation unit 130, by direct mapping, calculates an upper envelope, a lower envelope, and a mean envelope of a signal substantially at the same time so as to utilize various hardware resource effectively.

Figure 2:
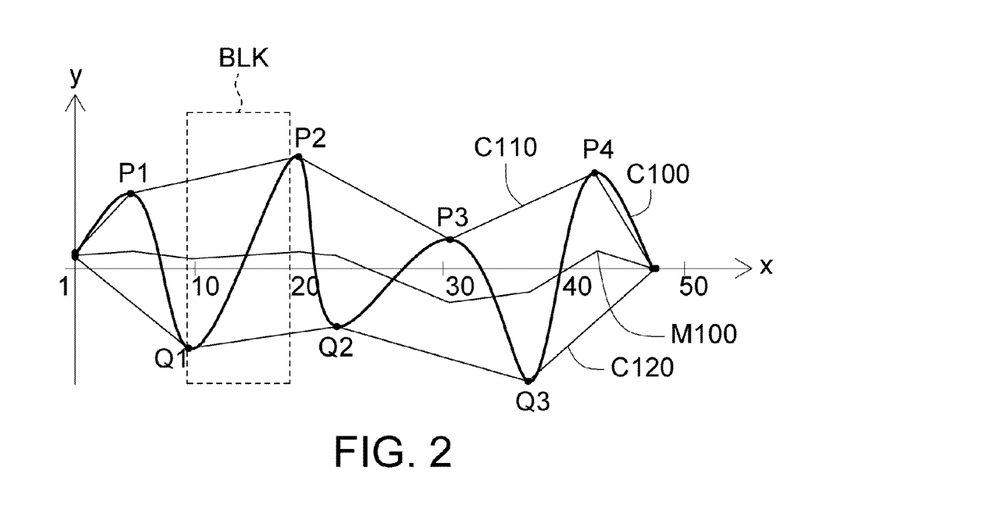
FIG. 2 illustrates that a mean envelope can be calculated according to one embodiment when the corresponding addresses on which the upper and lower envelopes are calculated are identical.

The extrema calculation unit 110 is used for outputting and storing maximum values (e.g. points P1~P4) and minimum values (e.g. points Q1~Q3) to the memory unit 150 according to sample data, such as a one-dimensional signal (as shown by a signal C100 in FIG. 2). The envelope calculation unit 130 is for calculating a mean envelope (e.g., M100) according to the maximum values and the minimum values. The memory unit 150, which provides memory space for the signal filtering apparatus 100, is composed of one or a number of memories, storage devices or storage media. For example, the memory areas A151 and A153 can be respectively used to store sample data and extreme data, while the memory area A155 can be used to store other calculation results.

Besides, for fulfilling requirement in an application, the signal filtering apparatus 100 of the first embodiment can further include a control unit for controlling operations among the extrema calculation unit 110, the envelope calculation unit 130, and the memory unit 150 to achieve an operation based on a calculation result of the above-mentioned extrema calculation unit 110 and envelope calculation unit 130. For example, the control unit 170 can be used to determine a calculation condition of the empirical mode decomposition in order that the signal filtering apparatus 100 can decompose the sample data of a signal into intrinsic mode functions. The control unit 170 can also be used to perform filtering processing and the signal filtering apparatus can be regarded as a multi-scale filter. Moreover, the signal filtering apparatus 100, for example, uses a data bus to be a communication channel for data, and control or address signals.

Figure 3:
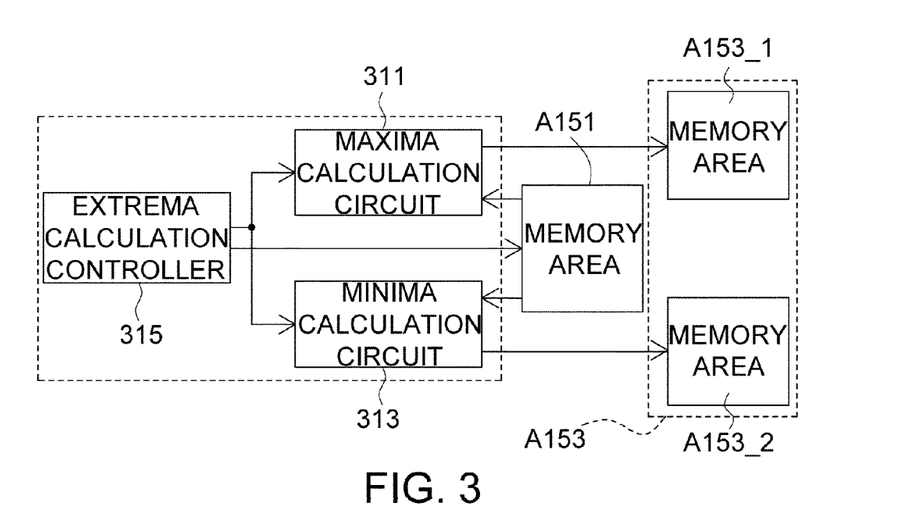
FIG. 3 is a block diagram of the extrema calculation unit of FIG. 1 in one example.

As shown in FIG. 3, the extrema calculation unit 110 can include a maxima calculation circuit 311, a minima calculation circuit 313, and an extrema calculation controller 315. Determination of extreme values, for example, is made by comparing multiple points, i.e., comparing slopes. For example, in comparison of three points, it is supposed that (x1, y1), (x2, y2) and (x3, y3) represent three sequential points of a signal. If the condition y1<y2 and y2≥y3 (or, y1≤y2 and y2>y3) is satisfied, it represents that y2 is a maximum value, and thus based on this condition, the maxima calculation circuit 311 can be implemented by using a digital or logic circuit. If the condition y1>y2 and y2≤y3 (or, y1≥y2 and y2<y3) is satisfied, it represents that y2 is a minimum value, and thus based on this condition, the minima calculation circuit 313 can be implemented by using a digital or logic circuit. The extrema calculation controller 315 controls the operation of extrema calculation of the extrema calculation unit 110, e.g., reading sample data from the memory area A151 to the maxima calculation circuit 311 and the minima calculation circuit 313. In addition, as for determination of extreme values at the boundary points, in one example, the extreme value at the left boundary can be set to the boundary point of the signal originally, while the extreme value at the right boundary (i.e., the N-th point of the signal) can be set to a previous extreme value (i.e., the (N−1)th point of the signal). Moreover, the boundary extreme value can be determined by comparing an extended line corresponding to the tendency of slope of the signal with a boundary point of the signal.

In the operation of the above extrema calculation unit 110, if a data amount of the sample data is N, the number of maximum values and minimum values are respectively N/2 at most. Therefore, it requires two pieces of memory space having a length of N/2 for storing extreme values and two pieces of memory space having a length of N/2 for storing addresses of the extreme values. As shown in FIG. 3, the memory area A151 stores the sample data, while the maximum values and minimum values of the sample data obtained by the maxima calculation circuit 311 and the minima calculation circuit 313 and their corresponding addresses can be stored in the memory area A153. In one example, the memory area A153 can be divided into an area A153_1 of absolute maxima and an area A153_2 of absolute minima for respectively storing the corresponding extreme values and their addresses. Besides, the number of maximum values and the number of minimum values can also be stored in the memory.

The operation of the above signal filtering apparatus 100 is not limited to the embodiment. In the first embodiment, as long as within the duration when the envelope calculation unit 130 respectively calculates the corresponding upper envelope (e.g., C110) and lower envelope (e.g., C120) based on the maximum values and minimum values, the envelope calculation unit 130 can output a value of the mean envelope to the memory unit 150 according to a value of the upper envelope and a value of a lower envelope with respect to a corresponding identical address, any alternative manner can be regarded an implementation of the first embodiment. The above-mentioned values of the upper envelope and the lower envelope corresponding to "an identical address" are, for example, respectively located in a portion of the segment P1–P2 and a portion of the segment Q1–Q2 corresponding to the sample data x[9] to x[20] (having "the identical address" 9 to 20), as shown by a dashed region BLK as indicated in FIG. 2. As such, the envelope calculation unit 130, as obtaining a value of the upper envelope and a value of the lower envelope corresponding to "an identical address", can calculate a value of the mean envelope accordingly. It is noted that values of the mean envelope are calculated when the envelope calculation unit 130 respectively calculates the upper envelope (e.g., C110) and the lower envelope (e.g., C120), and thus the envelope calculation unit 130 can be regarded to calculate the upper envelope, lower envelope and mean envelope of a signal substantially at the same time, thereby effectively using the hardware resources and increasing time efficiency.

Figure 4:
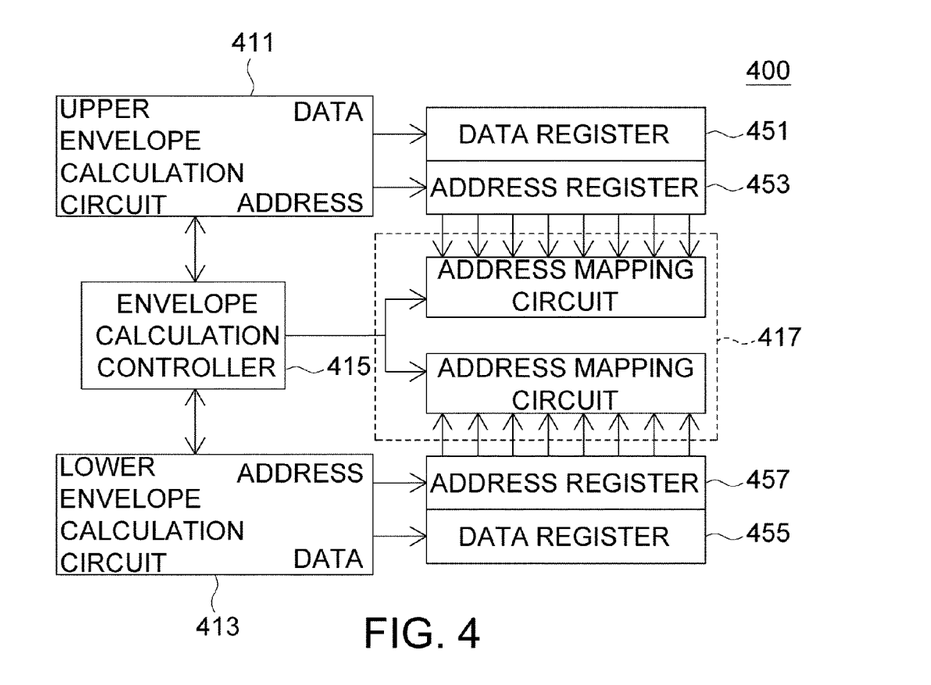
FIG. 4 is a block diagram of the envelope calculation unit in one example.

As mentioned above, in the first embodiment, the envelope calculation unit 130 can be implemented in various ways. For example, referring to FIG. 4, a block diagram of the envelope calculation unit 130 is shown. In FIG. 4, the envelope calculation unit 400 includes an upper envelope calculation circuit 411, a lower envelope calculation circuit 413, and an envelope calculation controller 415. The upper envelope calculation circuit 411 and the lower envelope calculation circuit 413 respectively obtain the maximum values and the minimum values calculated by the extrema calculation unit 110 (from the memory area A153), calculate the values of the (upper and lower) envelopes and their corresponding addresses by way of an envelope pattern, such as a straight-line envelope of extrema connection, and sequentially output them to registers. Through mechanism of address mapping, calculation is performed on a value of the upper envelope and a value of the lower envelope with respect to a corresponding identical address to output a value of the mean envelope to the memory unit 150.

For example, the upper envelope calculation circuit 411 reads two extrema (as shown by P1($x_1$, $y_1$) and P2($x_2$, $y_2$) in FIG. 2), and an envelope of extrema connection is taken as an example. The upper envelope calculation circuit 411 executes a calculation of a linear equation (Eq. 1) to calculate a value of each point on the upper envelope between the two points P1 and P2 and accordingly output them to a first-in-first-out (FIFO) data register 452 and store the addresses, e.g. sequential numbers 1, 2, . . . , 14, corresponding to the points of the upper envelope (corresponding to the addresses 5, 6, 7, 8, 9, . . . , 18 of the sample data) into an address register 453.

$$y = \frac{y_2 - y_1}{x_2 - x_1}(x - x_1) + y_1 \qquad \text{(Eq. 1)}$$

Similarly, the lower envelope calculation circuit 413 reads two minimum values Q1($x_1$, $y_1$) and Q2($x_2$, $y_2$) as shown in FIG. 2, calculates a value of each point on the lower envelope between the two points Q1 and Q2 as the operation of the upper envelope calculation circuit 411, accordingly outputs them to a data register 455, and stores the addresses, e.g. sequential numbers 1, 2, . . . , 14, corresponding to the values of points on the lower envelope (corresponding to the addresses 9, . . . , 22 of the sample data) into an address register 457. When calculating the upper and lower envelopes, the envelope calculation controller 425 respectively finds out envelope values, such as C110[9] and C120[9], C110[10] and C120[10], corresponding to identical addresses (9 and 10) from the address registers 453 and 457 through an address mapping circuit 417 by using an address-to-address mapping method or another comparing method. Therefore, the envelope calculation unit 400 can further calculate values of the mean envelope, e.g. (C110[9]+C120[9])/2, (C110[10]+C120[10])/2, by a calculation circuit (such as an addition calculation unit and a division calculation unit). For example, the address mapping circuit 417 includes an addition calculation unit and a register or other digital circuits for mapping the sequential numbers 1, 2, . . . , 14 of the points on the lower envelope between Q1 and Q2 into 9, 10, . . . , 22 with the extreme point Q1 corresponding to an address 9 of the sample data. Besides, in another example, the upper envelope calculation circuit 411 and the lower envelope calculation circuit 413 can be operated to directly output the address values corresponding to the addresses of the sample data (e.g. by an addition operation). Therefore, the envelope calculation unit 400 can operate without additionally using the address mapping circuit 417 of FIG. 4. Moreover, the registers used by the above envelope calculation unit 400 can also be applied in the memory unit 150.

Figure 5A:
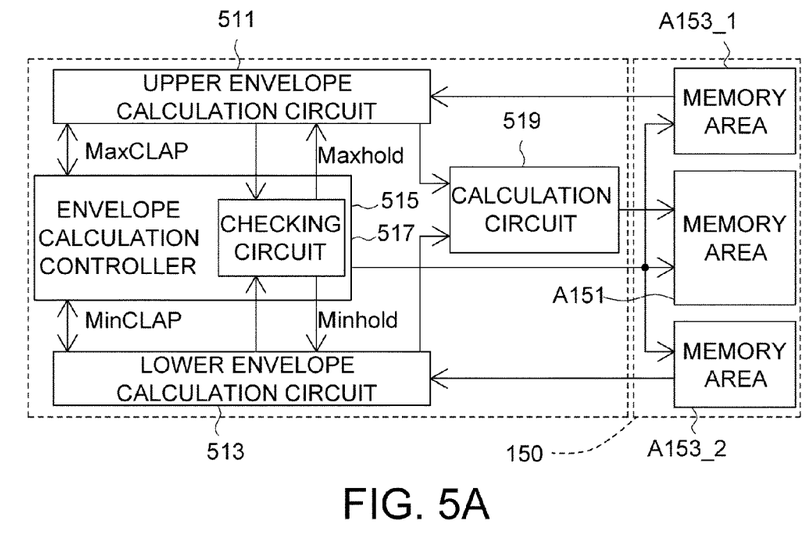
FIG. 5A is a block diagram of the envelope calculation unit in another example

Referring to FIG. 5A, a block diagram of the envelope calculation unit 130 in another example is shown. In FIG. 5, similar to the envelope calculation unit 400 of FIG. 4, the envelope calculation unit 500 substantially calculates a mean envelope at the same time when the upper and lower envelopes are calculated. The envelope calculation unit 500 includes an upper envelope calculation circuit 511, a lower envelope calculation circuit 513, an envelope calculation controller 515 and a calculation circuit 519. At the same time when the upper envelope calculation circuit 511 and lower envelope calculation circuit 513 respectively obtain extreme values from the memory areas A153_1 and A153_2 to calculate the upper and lower envelopes, the envelope calculation controller 515 checks whether the addresses under calculation are the same in order to determine whether a value of the mean envelope can be directly calculated by the calculation circuit 519 based on the corresponding values of the upper and lower envelopes and stored into the memory, such as memory area A151. For example, the envelope calculation controller 515 includes a checking circuit 517 for checking calculation of the upper envelope calculation circuit 511 and the lower envelope calculation circuit 513. When the addresses on which the upper envelope calculation circuit 511 and the lower envelope calculation circuit 513 are calculating are different, the circuit having a higher calculation speed enters a stand mode to wait for the other circuit calculating slower.

Figure 5B:
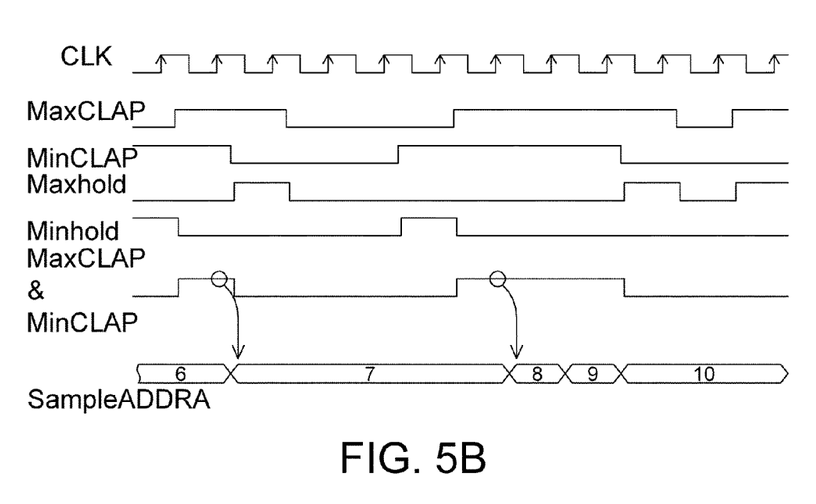
FIG. 5B is a timing diagram of the envelope calculation unit of FIG. 5A in one example.

Take the upper envelope calculation circuit 511 and the lower envelope calculation circuit 513 calculating envelopes by using the extrema connection method of Eq. 1 as an example. When one of the two circuits 511 and 513 is calculating a slope of two extreme points, the other one should enter the stand mode. Referring to FIG. 5B, a timing diagram of interaction among the checking circuit 517, the upper envelope calculation circuit 511 and the lower envelope calculation circuit 513 of FIG. 5A is shown. Along with periodical change of the clock CLK, when the upper envelope calculation circuit 511 completes a slope calculation of P1–P2, the indication signal MaxCLAP is set to 1 (a high level). Similarly, when the lower envelope calculation circuit 513 completes a slope calculation of Q1–Q2, the indication signal MinCLAP is set to 1. When the indication signals MaxCLAP and MinCLAP are both 1, it represents that the addresses on which the upper and lower envelopes are calculated are the same (as shown by the region BLK in FIG. 1, starting from the Q1 point), and a corresponding value of the mean envelope can be directly calculated by the calculation circuit 519. Conversely, when the indication signal MinCLAP is 0 (a low level) and MaxCLAP is 1, it represents that only the lower envelope calculation circuit 513 is calculating the slope, at the time, the checking circuit 517 needs to output a waiting signal Maxhold as a high-level pulse for ordering the upper envelope calculation circuit 511 to enter the stand mode. If the indication signal MinCLAP is changed to 1 and the indication signal MaxCLAP is 0, it represents that only the upper envelope calculation circuit 511 is calculating the slope, at the time, the checking circuit 517 needs to output a waiting signal Minhole as a high-level pulse for ordering the lower envelope calculation circuit 513 to enter the stand mode.

Besides, in another example, if the signal filtering apparatus 100 of the first embodiment performs empirical mode decomposition, each time when the mean envelope is obtained by calculation according to EMD algorithm, the present component signal $h_i$ should be subtracted by the mean envelope mean_envelope to generate a new component signal $h_{i+1}$, that is, $h_{i+1}=h_i-\text{mean\_envelope}$, wherein the component signal at first time is corresponding to the sample data of the original signal. Therefore, in addition that the calculation circuit 519 of FIG. 5A is operated to generate the values of the mean envelope, the envelope calculation unit 500 is further used to read the sample data or component signals stored in the memory area A153 and accordingly perform a subtraction calculation to generate new component signals and store their values back to the memory unit 150, wherein according to FIG. 5B, the address signal SampleADDRA is read and the operation of adding the address by one is performed based on MaxCLAP and MinCLAP to achieve the calculation of values of the new component signals.

Furthermore, the operation of the envelope calculation unit 130 substantially calculating the upper, lower and mean envelopes at the same time is not limited to the envelope of extrema connection, but can be also applied to other kinds of envelopes, such as an envelope of cubic spline.

Second Embodiment

In the second embodiment, in terms of an idle situation of a part of calculation circuits in envelope calculation, envelope period stealing is performed to use the idle part of circuit to improve the time efficiency of envelope calculation. For convenience of illustration, the envelope calculation unit 130 using the envelope of extrema connection is exemplified to illustrate how to use the idle part of circuit by envelope period stealing.

First, the behavior of the envelope calculation unit should be realized. According to the above Eq. 1, when operating in hardware, owing that the operation of a division circuit is slower than those of a multiplication circuit and an addition circuit, a counter should be used to count. When the system clock goes faster than the division calculation unit, an output result of the division calculation unit is caught as the counter counts to a certain value, which enables the division calculation unit to operate at a high frequency. For example, the original working clock of the division calculation unit is 9 MHz (it represents generating a result by 9 MHz). If the system operates over 100 MHz, a correct value of division calculation unit can be obtained only when the above counter counts to 12. Besides, another counter can be used to control an accumulating number of an accumulator and sequentially obtain by calculation all the y values on the line. In Eq. 1, the value (x2−x1) is a multiplier of 1, i.e. a positive integer, and is accumulated increasingly. Therefore, there can be two ways of hardware implementation as shown in FIGS. 6A and 6B.

Figure 6A:
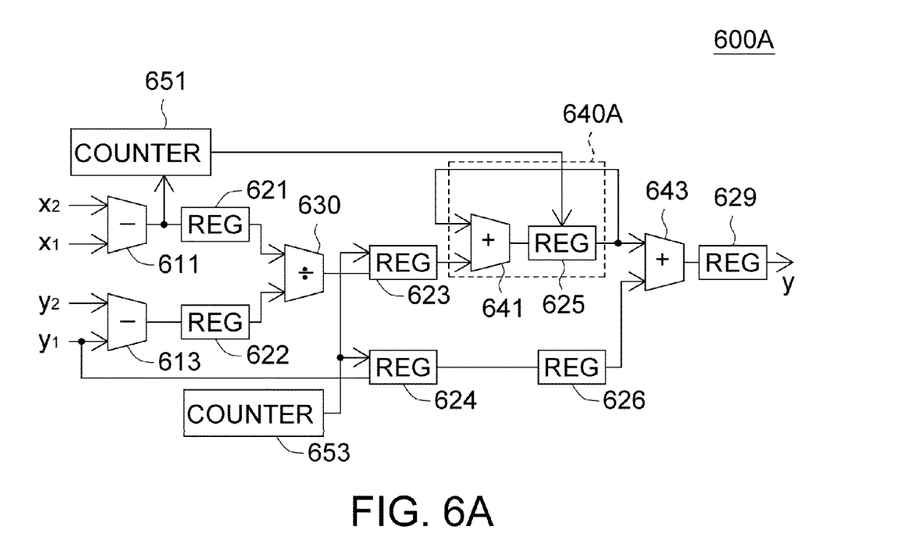
FIGS. 6A and 6B are two examples of the calculation circuits forming an envelope by extrema connection.

As shown in FIG. 6A, the calculation circuit 600A is used to calculate Eq. 1, including subtraction calculation units 611 and 613, registers (REG) 621, 622, . . . , 629, a division calculation unit 630, addition calculation units 641 and 643 and counters 651 and 653. In FIG. 6A, $(y_2-y_1)$ is divided by $(x_2-x_1)$ to obtain a slope first and then accumulation is performed. After the slope calculation is completed, all the y values between two extreme values can be obtained by an accumulation method through an accumulation circuit 640A. The calculation circuit 600A takes a sum of periods of the two counters 651 and 653 to complete the calculation of all the y values. By doing this, the error generated by the division calculation unit will be accumulated. However, this error can be reduced by increasing data width for the division calculation unit.

Figure 6B:
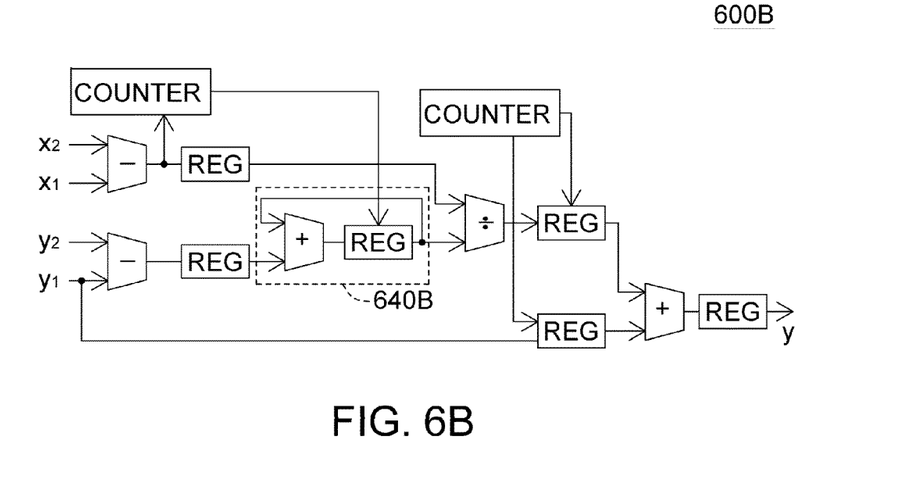

As shown in FIG. 6B, the calculation circuit 600B provides another circuit structure for calculating Eq. 1. Different from the calculation circuit 600A, $(y_2-y_1)$ is accumulated first through an accumulation circuit 640B and then divided by $(x_2-x_1)$. The error generated by the calculation circuit 600B will not be accumulated in this case, but a larger number of division operations should be performed. Therefore, the calculation circuit 600B takes a multiplication of periods of the two counters to complete the calculation of all the y values.

After the behavior of the envelope calculation unit is realized, the following description is given to illustrate how to use the idle part of circuit in the envelope calculation by the envelope period stealing in the second embodiment. Owing that the calculation circuit 600 A can calculate faster than the calculation circuit 600B and has the advantage of low power consumption, the calculation circuit 600A is taken as an example for illustration. In FIG. 6A, when the division calculation unit 630 finishes calculating the slope of two extreme points, the accumulation circuit 640A performs an accumulation operation according to a distance between the two extreme points. The division calculation cannot be performed on the next group of extreme points until the accumulation has been performed on all the points between the two extreme points. Before the accumulation operation is completed, the division calculation unit 630 and the related devices, such as the subtraction calculation unit 613, registers 621 and 622, are all in an idle state. Therefore, at the same time when the accumulation operation between two extreme points starts to be performed, the division calculation unit 630 performs the calculation for a next slope. Thus, this method will effectively use every period to achieve the maximum production.

Figure 7:
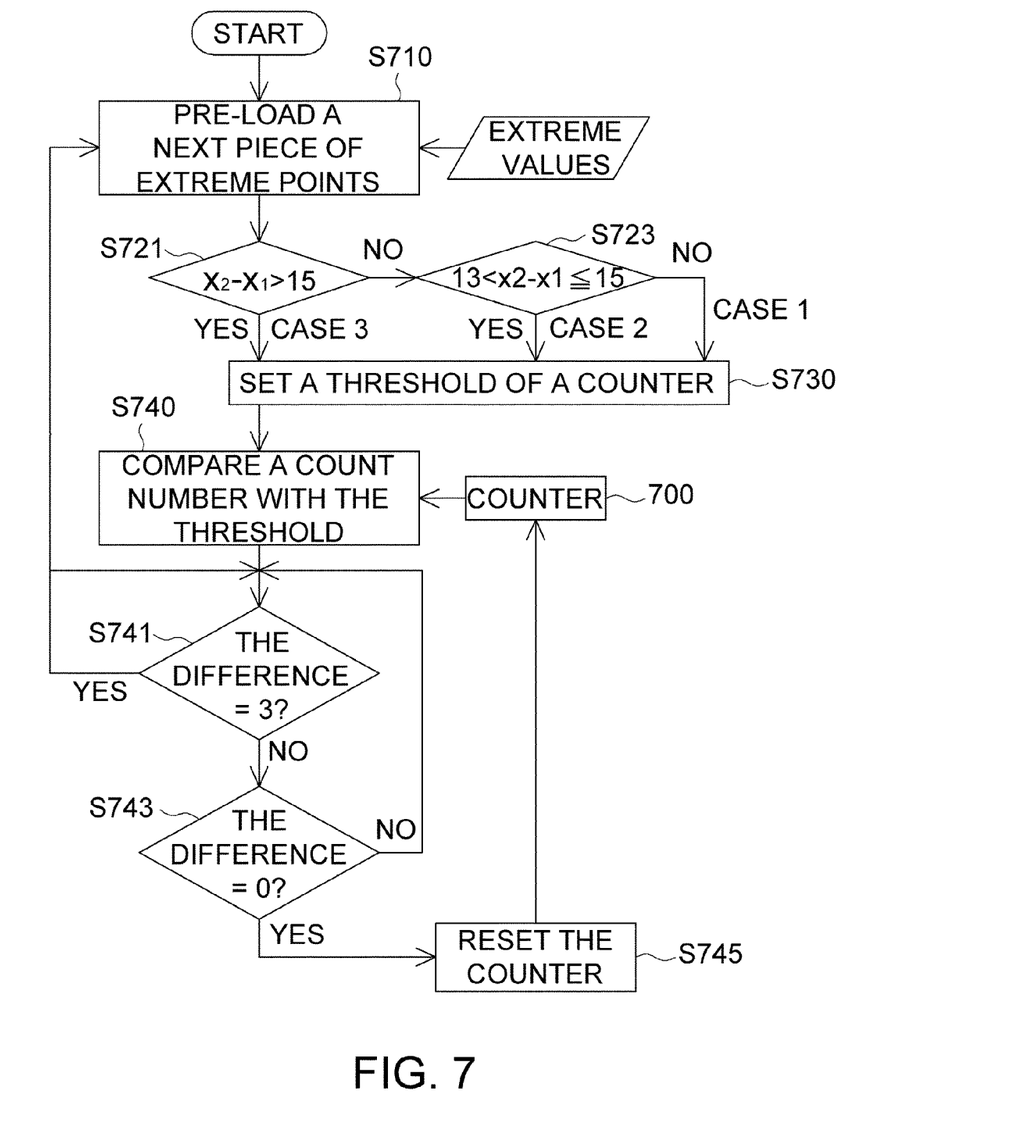
FIG. 7 is a flow chart of an example of determining whether to start period stealing according to a second embodiment.

FIG. 7 is a flow chart of determining to start period stealing in one example according to the second embodiment, wherein it is supposed that three fetch cycles are required from sending out an address until reading out data from the memory, it takes 13 periods to complete division calculation, and $(x_n-x_{n-1})$ is the period required by the calculation of the accumulation circuit. In order to perform the above period stealing operation, the count value DVI_Count of a counter 700 is set to have a maximum (N/2−1), about one half of the sample length. The value of DIV_Count is a sum of the data extracting period (0~2) and the division period (3~N/2−1), which is a value 0~N/2~1. It is noted that when the count value DIV_Count is counted to 12, an address is sent out to the memory or area storing extreme values to read the data; when the count value DIV_Count is counted to 15, it represents that the next extreme data is being read and at the same time, the accumulation operation corresponding to the previous slope and the next slope calculation start to be performed. According to the value $(x_2-x_1)$ in Eq. 1, there are three conditions to be considered as following.

Referring to FIG. 7, in step S710, a piece of extreme points are loaded in. Next, in step S721 or S723, it is determined whether the value $(x_2-x_1)$ satisfies one of the following three conditions. Following that, in step S730, threshold values of the counter are set, such as, a maximum of DIV_Count and a start value to be set when counting to the maximum.

Case 1: if the condition of the step S723 is not satisfied, i.e. it is determined that $(x_2-x_1) \leq 13$, it represents that the calculation of points between $x_2$ and $x_1$ takes less than 14 periods, i.e. less than DIV_Count=15 periods. It means that the next slope calculation can be performed to follow up the previous slope calculation. However, after DIV_Count is counted to 15, the count must be started from 3 rather than 0, because when the accumulation operation of the previous slope is completed, the next slope calculation has not been completed.

Case 2: if the condition of the step S723 can be satisfied, that is, it is determined that $13<(x_2-x_1)\leq 15$, it represents that the calculation of points between $x_2$ and $x_1$ requires less than DIV_Count=14 or 15 periods. It means that the next slope calculation can be performed to follow up the previous slope calculation, but after DIV_Count is counted to 15, the count must be started from a maximum of DIV_Count−$(x_2-x_1)$+1, i.e. 2 or 1, rather than 0. In this way, when the accumulation operation of the previous slope is completed, the next slope calculation is also completed.

Case 3: if the condition of the step S721 can be satisfied, that is, it is determined that $(x_2-x_1)>15$, it represents that the calculation of points between $x_2$ and $x_1$ requires more than DIV_Count=15 periods. It means that the next slope calculation can be performed to follow up the previous slope calculation, but after DIV_Count is counted to 15, the count must be started from 0 to $(x_2-x_1-1)$. Therefore, when the accumulation operation of the previous slope is completed, the next slope calculation is also completed and can be followed by the corresponding accumulation operation.

Afterwards, in step S740, the count DIV_Count of the counter 700 (as the counter 653 in FIG. 6A) is compared with its threshold (15). In step S741, it is checked if the above comparison result represents that the difference is 3 periods. If yes, that is, the count DIV_Count is 12, then on one hand, the step S710 is performed to pre-load the next piece of extreme points, and on the other hand, the comparison result of the step S740 is checked continuously. If it is determined that the difference is not 3 periods in the step S741, the step S743 is continued to determine whether the comparison result of the step S741 is that the difference is 0 period. Therefore, the steps S741 and S743 are executed until the comparison result show 0 in difference, and then the step S745 is performed in which the counter 700 is cleared according to the determination result of the step S730 from the above three conditions. That is, after DIV_Count is counted to 15, it is counted from a new value based on three conditions as mentioned above.

The designer can design a determination circuit executing period stealing according to the above flow chart of FIG. 7, and apply it in the calculation of the upper and lower envelopes in the above envelope calculation unit 500 of FIG. 5A or the envelope calculation unit 400 of FIG. 4. By doing this, the calculation of envelopes can be completed faster. For example, it can be converted to a circuit diagram in hardware description language, such as Verilog, or implemented by a digital or logic circuit. Besides, it is noted that the above embodiments are only examples but not used to limit the operation of the disclosure. As long as the envelope period stealing can be performed on the part of circuit which is idle in the envelope calculation, any implementation circuit can be regarded as an example of the embodiment. The period stealing processing of the above second embodiment, compared to the direct mapping of the first embodiment, can reduce about one half of the envelope processing time, that is, can increase up to about twice of the processing speed.

Embodiment Three

The embodiment performs an exception checking mechanism with respect to a repeating behavior of the circuit in envelope calculation to save even more envelope calculating time. For example, the above Eq. 1 is taken as an example, when $y_2-y_1=0$, the division calculation unit obtains the slope to be 0 after 13 periods. If it can be detected beforehand whether $y_2-y_1$ is 0, it can save the 13 periods of division operating time. It takes only 3 more periods to read the next piece of data for calculation in the memory. Similarly, when $x_2-x_1$ is a power of 2, it requires simply a bit shift to achieve the purpose of division, thereby saving the time for division operation. Moreover, a more proper design range can also be found by using a statistics analysis circuit to process data pattern. For example, in ten groups of analysis results for the instant mode, the conditions that $(x_2-x_1)$ is 1, 2, 4 and 8 account for 25% while the conditions that $(x_2-x_1)$ is 16, 64 and 128 account for less than 1%. Therefore, the former one can be considered into the range to be processed by the circuit, while the latter one can be neglected. As such, under an optimum condition, that is, $y_2-y_1=0$, and $x_2-x_1$ is a power of 2, 39% of the division operation can be saved. Especially, when the previous value $(x_2-x_1)$ gets smaller, the relative efficiency in slope calculation becomes higher.

Figure 8:
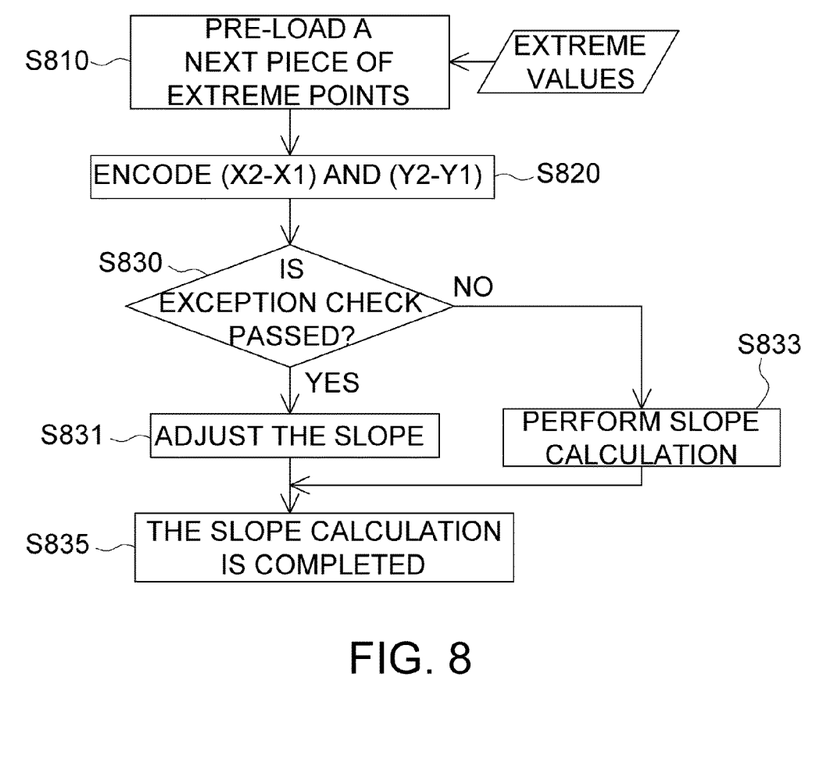
FIG. 8 is a flow chart of an example of an exception checking mechanism according to a third embodiment.

FIG. 8 is a flow chart of an exception checking mechanism in one example according to the third embodiment. In step S810, a piece of extreme points is loaded in beforehand. In step S820, encoding is performed on $(y_2-y_1)$ and $(x_2-x_1)$. In step S830, an exception check is performed. The exception condition is, for example, if $(y_2-y_1)$ is 0, or if $(x_2-x_1)$ is a power of 2, or any other condition capable of quickly obtaining the slope. If the condition of the step S830 is satisfied, as shown in the step S831, the slope is, for example, adjusted by shifting according to the conditions in the above discussion. If no, the original slope calculation is performed as shown in step S833. Finally, the slope calculation is completed (S835).

Figure 9:
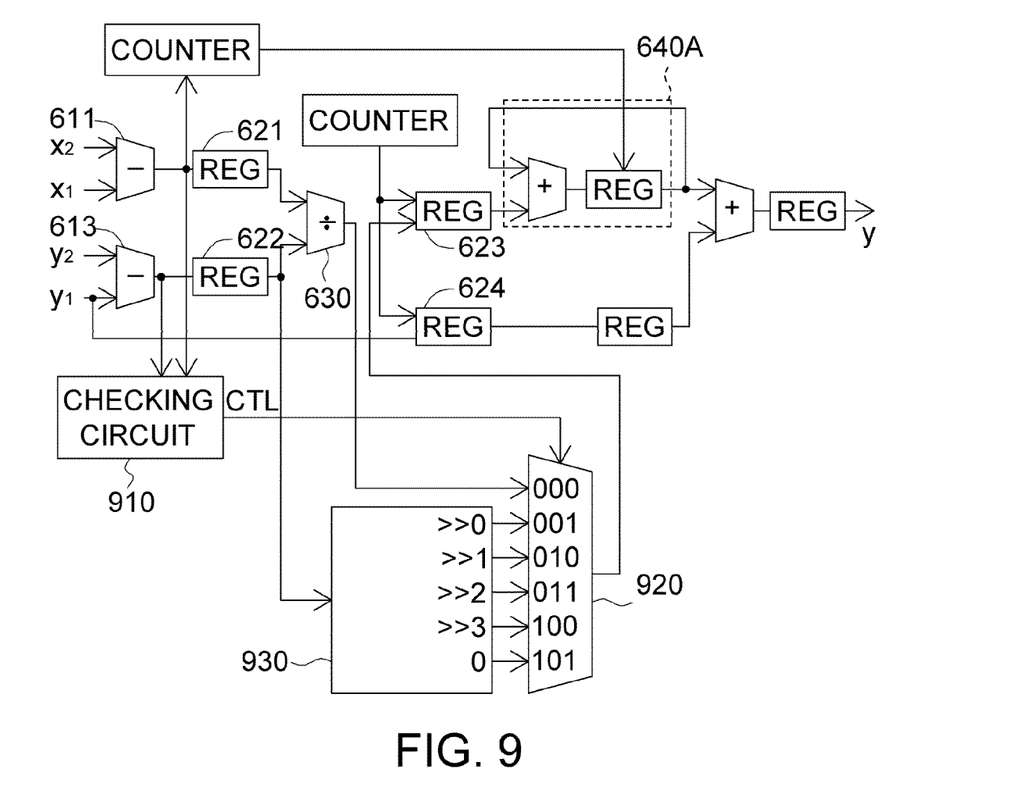
FIG. 9 is a block diagram showing one example of a circuit implementation combining the calculation circuit of FIG. 6A and an exception checking mechanism of FIG. 8.

The designer can design an envelope calculation unit executing the exception checking mechanism based on the above flow chart of FIG. 8 and apply it in the calculation of upper and lower envelopes in the envelope calculation unit 500 of FIG. 5A or the envelope calculation unit 400 of FIG. 4. For example, FIG. 9 shows a block diagram of a calculation circuit which combines the calculation circuit 600A of FIG. 6A and a circuit operation of the exception checking mechanism of FIG. 8. The difference between the circuits of FIG. 9 and FIG. 6A lies on that a multiplexer 920 and a related logic circuit 930 (or any other suitable operation circuit) are added in the circuit of FIG. 9 to be an auxiliary calculation circuit. The logic circuit 930 includes a bit shifting circuit or other digital circuits to generate an operation of shifting $(x_2-x_1)$ by 1, 2 or 3 bits or to provide a value 0 for output. The checking circuit 910 is for performing the step S820 to determine whether the exception condition is satisfied and output a control signal CTL to the multiplexer 920. For example, the conditions that CTL=000, 001, 010, 011, 100 and 101 respectively denote selecting the output of the division calculation unit 630, the output (x2−x1)>>0, (x2−x1)>>1, (x2−x1)>>2, (x2−x1)>>3 and 0 of the logic circuit 930. Therefore, when the checking circuit 910 determines the exception condition is satisfied, the slope calculation may be completed even faster by selecting one of the outputs of the logic circuit 930 through the multiplexer 920 according to the control signal CTL. The above exception processing mechanism of the third embodiment can reduce more than one half of envelope processing time, as compared to the direct mapping of the first embodiment, that is, can increase up to more than twice of the processing speed.

Other Embodiments

Method of Efficiently Using Memory

If the signal filtering apparatus 100 is used to perform the empirical mode decomposition, the following algorithm of empirical mode should be executed:

```
org_signal=Samples;
for i=1:IMFsNum
    h=org_signal;
    for j=1:iteration
        Extrema( );
        Envelope( );
        mean_envelope;
        h= h-mean_envelope;
    end
    oIMFs(:,i)=h;
    org_signal= org_signal-h;
end
```

The above-mentioned embodiments have discussed the extrema calculation unit (i.e. a circuit for calculating Extrema ( )) and the envelope calculation unit (i.e. a circuit for calculating Envelope ( )). The iteration in the above algorithm is to sieve the value h of the component signal in the inner circle until it satisfies a condition of basic mode function to obtain a mode. Afterwards, a new value org_signal is obtained by calculation through the outer circle according to the obtained mode (the 12-th line in the algorithm), and then a next mode is calculated. This part of calculation and control including determination of signal tendency and baseband, that is, the related control operation of mode searching, can be, for example, controlled by the control unit 170 of the signal filtering apparatus 100.

As observing the above empirical mode decomposition, from the mode obtaining, h=org_signal in the third line of the algorithm, h=h−mean_envelope in the 8-th line and org_signal=org_signal−h in the 11-th line, it can be known that an extra memory space for storing the values h is needed to prevent that the value org_signal in the operation of the 8-th line is covered to cause an error in the calculation of the 11-th line. By observing oIMFs(:,i)=h in the 10-th line, it can be known that the memory, such as the memory area A155, for storing intrinsic mode functions IMF is set only after the operation of the inner circle has been completed. Therefore, the value org_signal can be backup to the memory area A155 first when j=0, and be read out when j=iteration−1, and the operations of the 10-th and 11-th lines can be performed at the same time.

Figure 10:
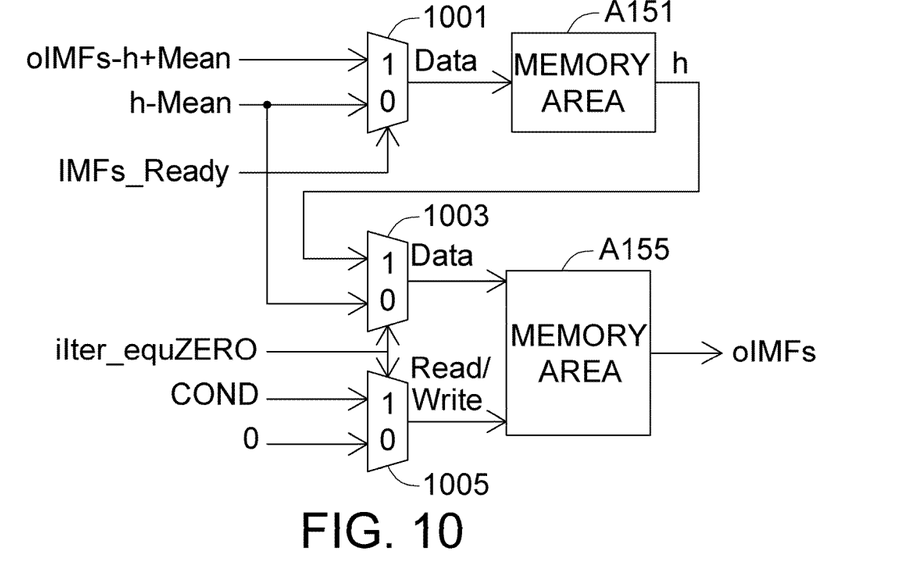
FIG. 10 is one example of how to efficiently use the memory as performing empirical mode decomposition by the signal filtering apparatus 100.

As shown in FIG. 10, the calculation result of (h−mean_envelope) obtained at each time will be stored in the above memory area A151 for storing sample data, but when j=iteration−1, the stored value is org_signal_h. Therefore, the memory area A155 is written twice, at the first time when j=0 (ilter_equZERO=HIGH), signal backup is performed. Only at the second time when j=iteration−1 (IMFs_Ready=HIGH), the value h is stored.

The circuit of FIG. 10 including multiplexers 1001, 1002 and 1003 can be applied in the control unit 170 of FIG. 1, wherein oIMFs symbolize the IMF values obtained from the memory (memory area A155) for storing IMF, Mean symbolizes a value of the mean envelope, IMFs_Ready is, for example, HIGH (e.g. 1) representing that an IMF is obtained at present. Thus, when IMFs_Ready=HIGH, the output result (Data) of the multiplexer 1001 is oIMFs−(h−Mean)=oIMFs−h+Mean, which is a new IMF value. When IMFs_Ready=LWO, the Data of the multiplexer 1001 is h−Mean, which is a value of a new component signal. Whether the output result (Data) of the multiplexer 1003 is written to the memory for storing IMF is determined by a writing signal Write outputted by the multiplexer 1005, wherein COND= (WriteIMFs|IMFs_Ready)& WriteMEMB. Besides, whether oIMFs are to be read is determined by a reading signal Read outputted by the multiplexer 1005.

Hardware Rounding Off and Overflow Detection

In order that the calculation for fixed points gets closer to the calculation for floating points in hardware, the mechanism of rounding off is used. It is supposed that in the hardware operation (for fixed point), the effect for directly cutting off 4.5 and −4.5 is that the positive number 4.5 is changed to 4 and the negative number −4.5 is changed to −5. In a loop calculation, adding in the rounding-off mechanism can reduce error accumulation. The determination method is performed as following: a positive number is denoted by $(b_7 b_6 b_5 b_4.b_3 b_2 b_1 b_0)$, and whether to add by 1 is determined from $b_7$ and $b_3$, that is, an integer is added by $(\sim b_7 \& b_3)$. For example, $3.5_{10}$ is $0011.1000_2$, round(3.5)=4, i.e. round $(0011.1000_2)$=$0100.0000_2$. $3.375_{10}$ is $0011.0110_2$, round (3.375)=3, i.e. round $(0011.0110_2)$=$0011.0000_2$. A negative number is denoted by $(b_7 b_6 b_5 b_4.b_3 b_2 b_1 b_0)$, and whether to add by 1 is determined by $b_7$ and $b_3 b_2 b_1 b_0$, that is, an integer is added by $(\sim b_7 \& b_3 \& (b_2|b_1|b_0))$. For example, $-3.5_{10}$ is $1100.1000_2$, round(−3.5)=−4, i.e. round $(1100.1000_2)$ =$1100.0000_2$. $-3.375_{10}$ is $1100.1010_2$, round(−3.375)=−3, i.e. round $(1100.1010_2)$=$1101.0000_2$.

Figure 11:
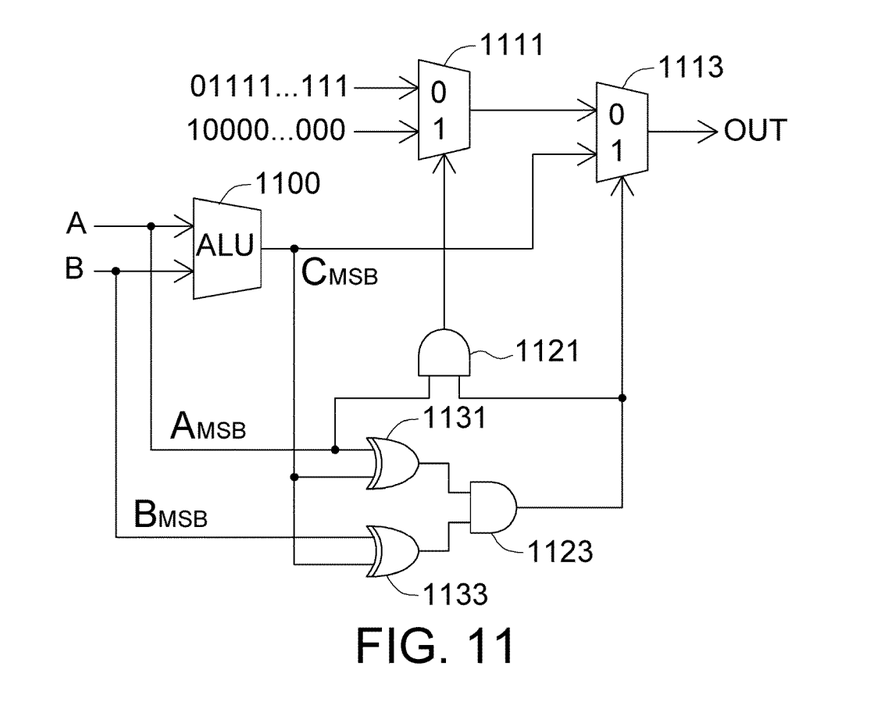
FIG. 11 is one example of an overflow detection circuit.

In hardware calculation, an overflow condition may occur, and thus when overflow occurs in calculation, the result can be set to a full scale (positive saturation or negative saturation), as shown by two inputs 01111...111 and 10000...000 of a multiplexer 1111 of FIG. 11, to prevent generation of an unpredicted result. Supposed that the input $A_{0 \sim n-1}$ and $B_{0 \sim n-1}$ has a data width of n bits, in FIG. 11, the calculation unit (ALU) 1110 outputs $C_{0 \sim n}$ having a data width of (n+1) bits. The overflow condition can be determined according to the operational results of exclusive or gates 1131 and 1133 as performing exclusive or operations on the most significant bits (MSB) inputted to A and B and the (n−1) bits of C outputted by ALU 1100, then it is determined to be a positive or negative saturation based on the MSB of A or B. Accordingly, it is controlled whether the output OUT of the multiplexer 1113 is used to a full scale.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An apparatus for frequency division and filtering, comprising:
    a memory unit, for storing sample data;
    an extrema calculation unit, for outputting and storing a plurality of maximum values and a plurality of minimum values of the sample data to the memory unit;
    an envelope calculation unit, for calculating a mean envelope according to the maximum values and the minimum values, wherein within a duration when the envelope calculation unit calculates an upper envelope and a lower envelope respectively according to the maximum values and the minimum values, the envelope calculation unit outputs a value of the mean envelope to the memory unit according to a value of the upper envelope and a value of the lower envelope with respect to a corresponding identical address; and
    a control unit, for generating values of a component signal according to values of the mean envelope and the sample data, wherein the control unit controls the extrema calculation unit and the envelope calculation unit to decompose the sample data into a plurality of intrinsic mode functions according to the values of the component signal by using an empirical mode decomposition method.

2. The apparatus according to claim 1, wherein the envelope calculation unit comprises:
    an upper envelope calculation circuit, for calculating the upper envelope according to the maximum values;
    a lower envelope calculation circuit, for calculating the lower envelope according to the minimum values; and
    an envelope calculation controller, for outputting the value of the mean envelope to the memory unit according to the value of the upper envelope and the value of the lower envelope with respect to the corresponding identical address within the duration when the upper envelope calculation circuit and the lower envelope calculation circuit respectively calculate the upper envelope and the lower envelope according to the maximum values and the minimum values.

3. The apparatus according to claim 2, wherein the envelope calculation unit further comprises:
a calculation circuit, for calculating the value of the mean envelope according to the value of the upper envelope and the value of the lower envelope with respect to the corresponding identical address.

4. The apparatus according to claim 2, wherein the envelope calculation unit comprises:
a checking circuit, for controlling the upper envelope calculation circuit and the lower envelope calculation circuit to respectively output the value of the upper envelope and the value of the lower envelope with respect to the corresponding identical address according to indication signals outputted by the upper envelope calculation circuit and the lower envelope calculation circuit.

5. The apparatus according to claim 2, wherein the upper envelope calculation circuit comprises a first calculation unit and a second calculation unit for calculating the upper envelope according to the maximum values;
wherein after the first calculation unit outputs a first calculation result to the second calculation unit, while the second calculation unit performs calculation to obtain values of the upper envelope according to the first calculation result, the envelope calculation controller controls the first calculation unit to continue processing a next first calculation result.

6. The apparatus according to claim 5, wherein the upper envelope calculation circuit further comprises: a counter for counting a time period during which the first calculation unit performs calculation to output the first calculation result;
wherein the envelope calculation controller controls the first calculation unit to continue processing the next first calculation result, according to the time period counted by the counter.

7. The apparatus according to claim 5, wherein the first calculation unit comprises a division calculation unit.

8. The apparatus according to claim 7, wherein the second calculation unit comprises an accumulation circuit, wherein the upper envelope calculation circuit generates the values of the upper envelope by connection of extrema points.

9. The apparatus according to claim 5, wherein the upper envelope calculation circuit further comprises:
a checking circuit for checking whether values of two maximum points satisfy an exception condition;
an auxiliary calculation circuit, wherein the upper envelope calculation circuit, according to whether the values of the two maximum points satisfy the exception condition, selectively uses one of the auxiliary calculation circuit and the first calculation circuit to obtain the first calculation result.

10. The apparatus according to claim 2, wherein the lower envelope calculation circuit comprises a first calculation unit and a second calculation unit, for calculating the lower envelope according to the minimum values;
wherein after the first calculation unit outputs a first calculation result to the second calculation unit, while the second calculation unit performs calculation to obtain values of the lower envelope according to the first calculation result, the envelope calculation controller controls the first calculation unit to continue calculation to generate a next calculation result.

11. The apparatus according to claim 10, wherein the lower envelope calculation circuit further comprises a counter for counting a time period during which the first calculation unit performs calculation to output the first calculation result;
wherein the envelope calculation controller controls the first calculation unit to continue processing the next first calculation result according to the time period counted by the counter.

12. The apparatus according to claim 10, wherein the first calculation unit comprises a division calculation unit.

13. The apparatus according to claim 12, wherein the second calculation unit comprises an accumulation circuit, wherein the lower envelope calculation circuit generates the values of the lower envelope by connection of extreme points.

14. The apparatus according to claim 12, wherein the lower envelope calculation circuit further comprises:
a checking circuit, for checking whether values of two minimum points satisfy an exception condition;
an auxiliary calculation circuit, wherein the lower envelope calculation circuit, according to whether the values of the two minimum points satisfy the exception condition, selectively uses one of the auxiliary calculation circuit and the first calculation circuit to obtain the first calculation result.

15. The apparatus according to claim 10, wherein the lower envelope calculation circuit further comprises:
a checking circuit, for checking whether values of two minimum points satisfy an exception condition;
an auxiliary calculation circuit, wherein the lower envelope calculation circuit, according to whether the values of the two minimum points satisfy the exception condition, selectively uses one of the auxiliary calculation circuit and the first calculation circuit to obtain the first calculation result.

16. The apparatus according to claim 1, wherein the extrema calculation unit comprises:
a maxima calculation circuit, for outputting the maximum values of the sample data according to the sample data;
a minima calculation circuit, for outputting the minimum values of the sample data according to the sample data;
an extrema calculation controller, for reading the sample data and controlling the maxima calculation circuit and the minima calculation circuit to output and store the maximum values and minimum values of the sample data into the memory unit.

17. A method for frequency division and filtering, comprising:
based on sample data, outputting and storing a plurality of maximum values and a plurality of minimum values of the sample data into a memory unit;
calculating a mean envelope according to the maximum values and the minimum values by using an envelope calculation unit, wherein within a duration when an upper envelope and lower envelope are calculated according to the maximum values and the minimum values, a value of the mean envelope is outputted to the memory unit according to a value of the upper envelope and a value of the lower envelope with respect to a corresponding identical address;
generating values of a component signal according to values of the mean envelope and the sample data; and
decomposing the sample data into a plurality of intrinsic mode functions by using an empirical mode decomposition method according to the values of the component signal and iteration of the step of:
outputting and storing the plurality of maximum values and the plurality of minimum values of the sample data into the memory unit on sample data; and calculating the mean envelope according to the maximum values and the minimum values by using the envelope calculation unit.

18. The method according to claim 17, wherein the step of outputting the value of the mean envelope comprises:
performing a first calculation by the envelope calculation unit to generate a first calculation result;
performing a second calculation by the envelope calculation unit to calculate values of the upper envelope or values of the lower envelope according to the first calculation result;
wherein while the second calculation is performing, the envelope calculation unit is controlled to perform the first calculation to generate a next first calculation result.

19. The method according to claim 18, wherein the step of outputting the value of the mean envelope further comprises:
calculating a time period during which the first calculation is performed to generate the first calculation result;
according to the calculated time period, controlling the envelope calculation unit to continue performing the first calculation to generate a next first calculation result.

20. The method according to claim 18, wherein the first calculation comprises a division calculation.

21. The method according to claim 20, wherein the second calculation comprises an accumulation calculation, and the envelope calculation unit generates the values of the upper envelope or the values of the lower envelope by way of connection of extreme points.

22. The method according to claim 18, wherein the step of outputting the value of the mean envelope further comprises:
checking whether values of two maximum points satisfy an exception condition;
according to whether the values of the two maximum points satisfy the exception condition, selectively using one of an auxiliary calculation and the first calculation to obtain the first calculation result.

23. The method according to claim 22, wherein the first calculation comprises a division calculation.

* * * * *